United States Patent
Fox et al.

(10) Patent No.: US 6,879,807 B2
(45) Date of Patent: Apr. 12, 2005

(54) REMOTE ACCESS UNIT FOR WIRELESS WIDE-AREA DATA NETWORKING

(75) Inventors: Brian L. Fox, Colorado Springs, CO (US); John K. Reece, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 10/121,992

(22) Filed: Apr. 12, 2002

(65) Prior Publication Data

US 2003/0195015 A1 Oct. 16, 2003

(51) Int. Cl.[7] .............................................. H04B 7/15
(52) U.S. Cl. ..................................... 455/11.1; 455/557
(58) Field of Search ........................ 455/7, 11.1, 15, 455/20, 550.1, 556.1, 557

(56) References Cited

U.S. PATENT DOCUMENTS

| | | | | |
|---|---|---|---|---|
| 5,558,541 A | * | 9/1996 | Botka et al. | ................. 439/675 |
| 5,812,933 A | * | 9/1998 | Niki | ............................. 455/16 |
| 6,664,891 B2 | * | 12/2003 | Davies et al. | ................ 340/505 |
| 6,741,836 B2 | * | 5/2004 | Lee et al. | ................... 455/41.2 |
| 2001/0031637 A1 | * | 10/2001 | Suzuki | ........................ 455/435 |
| 2002/0028655 A1 | * | 3/2002 | Rosener et al. | ................ 455/16 |
| 2002/0061729 A1 | * | 5/2002 | Zhang | ........................ 455/11.1 |
| 2002/0183038 A1 | * | 12/2002 | Comstock et al. | ........... 455/406 |
| 2003/0008612 A1 | * | 1/2003 | Andreason | .................. 455/11.1 |

* cited by examiner

Primary Examiner—Nguyen T. Vo
(74) Attorney, Agent, or Firm—Lanny L. Parker

(57) ABSTRACT

A system is disclosed having a remote access unit and two transceiver modes, one for implementing wireless wide area network communications and another for implementing local wireless network communications. High speed data communications with a cellular system may be maintained in the wireless wide area network mode with the advantage of a flexible and unconstrained remote access unit, which can be placed for improved wireless reception. Computers and other devices with complementary wireless personal network communications protocol units may connect to a wireless wide area network through the remote access unit.

5 Claims, 4 Drawing Sheets

REMOTE ACCESS UNIT FOR WIRELESS WIDE-AREA DATA NETWORKING

Home and mobile computers, such as laptops and personal digital assistants, may need access to a network such as a public switched telephone network (PSTN) so they can gain access to an Internet Service Provider (ISP), Internet Access Provider (IAP), or a private local area network. To achieve this end, most home and mobile computers use modems that are connectable to the PSTN through a standard RJ-11 plug and cable. A drawback to this approach is that cables must be strung and carried, and the length of the cable, and/or placement of a wall jack limits the field of workspace.

To overcome the constraints imposed by cabling, telecommunications and networking companies have developed wireless modems for laptops and personal computers. The wireless modems may remove many of the physical constraints previously imposed by physical cabling, but also introduce new constraints. Now, the antenna itself, often a short monopole or a small internal conformal element integrated with a PCMCIA compliant card, presents drawbacks.

The drawbacks introduced by the standard antenna solution may include poor radio reception and transmission. The physical constraints previously imposed by the length of the physical cabling are now present in the form of electrical/physical constraints attendant to the antenna radiation patterns and gain. As for poor reception, the most common problem is that the antenna is designed to meet the unobtrusive form factor (for instance the PCMCIA enclosure), which may result in less than desirable signal quality and data rates.

Accordingly, it is desirable to provide an antenna in the desired form factor while maintaining good reception and electrical characteristics.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
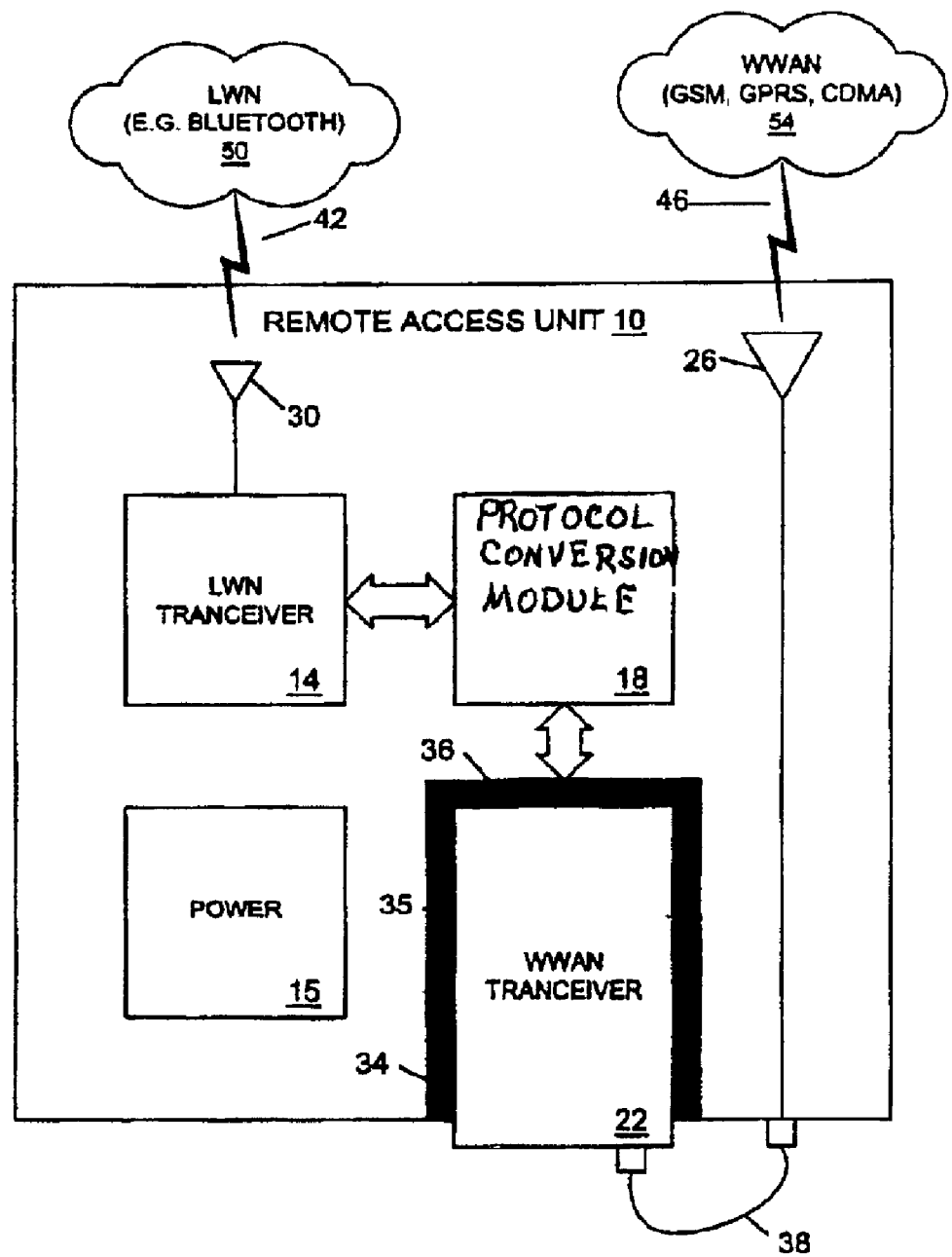
FIG. 1 depicts an embodiment of a remote access unit.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 depicts a wireless remote access unit 10 that may be shaped and configured so that it can be mechanically attached to a wall, window, or other mounting bracket where antenna reception to an external cellular network is strong. As for the physical packaging, it may be configured to mechanically accommodate a wide variety of cellular antenna configurations, including antenna types with narrow beam widths and higher gain than short monopole antennas.

Wireless remote access unit 10 may be configured to have two transceivers, an LWN transceiver 14 and a WWAN transceiver 22. LWN transceiver 14 may access a Local Wireless Network (LWN) 50 such as, for example, a Wireless Personal Access Network (WPAN.) A Bluetooth or another IEEE 802.15 compliant wireless network access protocol or a wireless local area network protocol may be employed.

WWAN transceiver 22 may access a Wireless Wide Area Network (WWAN) 54, such as the well known and widely deployed GSM, GPRS, and CDMA protocols, or another broadband cellular/wireless network access protocol. Through WWAN transceiver 22, an Internet Access Provider (IAP), or Internet Service Provider (ISP) may be contacted so that network communications through a Virtual Private Network (VPN) or access to the Internet may be achieved.

In one embodiment, the two transceivers operate simultaneously and data may be exchanged between LWN transceiver 14 and WWAN transceiver 22, typically after a protocol conversion module 18 conditions the data. However, in another embodiment, one or more of the transceiver models may be partially implemented so that wireless wide area network decoding is performed by a unit associated with another transceiver model or another computing device. For instance, WWAN transceiver 22 may be configured to sample the WWAN radio received waveform, but the WWAN packets may actually pass through link 42 to another device with an LWN transceiver 14, and that device, or a protocol conversion module communicatively coupled with it, may decode and process the signals that originally were sampled by WWAN transceiver 22. Thus, WWAN transceiver 22 may sample the received data, but pass the sampled data to another unit for re-transmission or re-routing to a computational unit that may perform further call processing on the sampled data.

Wireless wide area network (WWAN) transceiver 22 may be coupled through a protocol conversion module 18 to Local Wireless Network (LWN) transceiver 14. WWAN transceiver 22 may be plugged into wireless remote access unit 10 as a Personal Computer Memory Card International Association (PCMCIA) type card, an application specific integrated circuit, or a portion of the chipset of a printed circuit board that includes one or more microprocessors that perform the methods and techniques described herein.

Protocol conversion module 18 typically includes software modules that may be executed from a persistent memory communicatively coupled to a microprocessor. In another embodiment, protocol conversion module 18 may include hardwired-circuitry such as, for example, glue logic, gate arrays, or other electronic circuit components or even an application specific integrated circuit (ASIC) that executes and functions without the need for a microprocessor. Protocol conversion module 18 may include instructions and logic for conditioning, buffering, and arbitrating data and control signals between the two transceiver protocols. Thus, protocol conversion module 18 may receive data having a first format (from a first transceiver) and provide the data having a second format (for a second transceiver), so that the respective transceivers may handle the underlying data.

Electrically coupled to WWAN transceiver 22 may be a WWAN antenna 26. WWAN antenna 26 may be a dipole antenna, or alternatively, a planar quad-band dipole antenna. The type of antenna coupled to WWAN transceiver 22 does not limit the subject matter of the claimed invention. WWAN antenna 26 and WWAN transceiver 22 maintain a link 46 to WWAN 54. Likewise, LWN transceiver 14 is electrically coupled to the LWN antenna 30 and the combination of the two elements maintains link 42 to LWN 50.

A power module 15 is also shown in remote access unit 10. Power module 15 may include a power transformer for receiving an external AC power supply or a battery pack that may include conditioning circuitry for regulating power to the various elements of remote access unit 10.

Also shown in FIG. 1 is an optional WWAN transceiver slot 34 for receiving WWAN transceiver 22. The slot may include a mechanical guide portion 35 for aligning the received WWAN transceiver 22, and an electrical receptacle 36 for communicatively coupling/mating one end of WWAN transceiver 22 to protocol conversion module 18. According to one embodiment, WWAN transceiver slot 34 is preferably a PCMCIA Type II or Type III conforming slot and receptacle configured to receive a 68-pin connector at the inserted end of WWAN transceiver 22, which makes a preferred embodiment of WWAN transceiver 22 a PCMCIA Type II or Type III conforming enclosure. In the slotted remote access unit embodiment, an RF cable 38 may be used to electrically couple WWAN antenna 26 to WWAN transceiver 22.

Alternatively, WWAN transceiver 22 may be communicatively coupled to WWAN antenna 26 through one or more of the 68-pin connector leads/receptacles, or it may be coupled through electrically conductive bumps or spring contacts. In yet another embodiment, the connector may be an integrated blind mate, which is configured to mechanically connect with WWAN transceiver 22 when the transceiver is inserted into WWAN transceiver slot 34.

Figure 2:
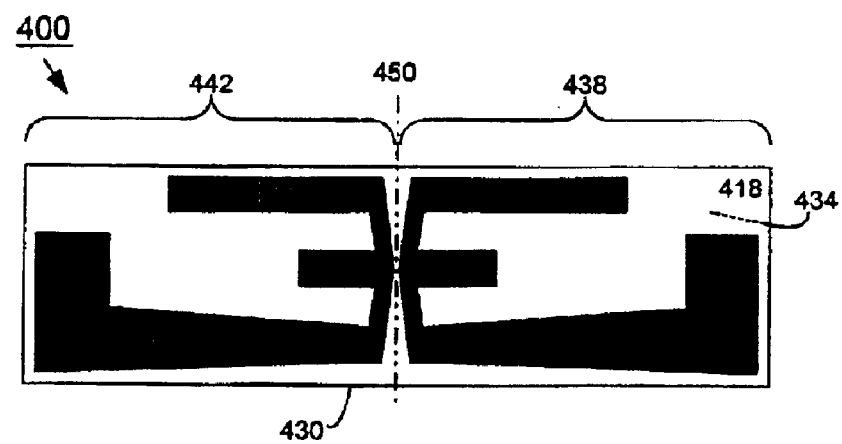
FIGS. 2 and 3 depict embodiments of an exemplary dipole antenna module.

FIG. 2 depicts an embodiment having a planar quad band dipole antenna module. Antenna module 400 may be characterized by two sets of dipole antenna elements, i.e., 438 and 442, both disposed on the same side of a substrate 430, although they may be on opposite sides of the substrate. Here, substrate 430 is approximately 4 inches (10.16 cm) wide and 1.20 inches (3.05 cm) tall, although the dimensions of substrate 430 are not limiting to the scope of the claimed invention.

Each set of dipole antenna elements may be broken into four components. Elements 404 and 408 are broadband antenna elements. Elements 406 and 410 are tapered lower frequency elements. The two sets of dipole antenna elements 438 and 442 may further include pads 414 and 416 that may be centered between the two major elements of each set of dipole antenna elements. In one embodiment, elements 404 and 408, and pads 414 and 416 may each have a height of 0.20 inches (0.51 cm). Elements 404 and 408 may each have a width of 1.17 inches (2.97 cm), while pads 414 and 416 may each have a width of 0.50 inches (1.27 cm).

Extension tuning elements 407 and 411 may also be included with the two sets of dipole antenna elements. Tuning elements 407 and 411 may have a height of 1.14 inches (2.90 cm), which may be close to the height of substrate 430. However, depending on the enclosure that surrounds substrate 430, tuning elements 407 and 411 may be trimmed for varying enclosure configurations.

As is depicted in FIG. 2, the first set of dipole antenna elements 438 may be reflected about an axis 450, creating a mirror image second set of dipole antenna elements 442. While, in general, the two sets of dipole antenna elements typically match, it should be noted that the extension tuning elements 407 and 411 may be varied between the two sets, as one enclosure design might change the RF impedance of one of the sets of dipole antenna elements.

Figure 3:
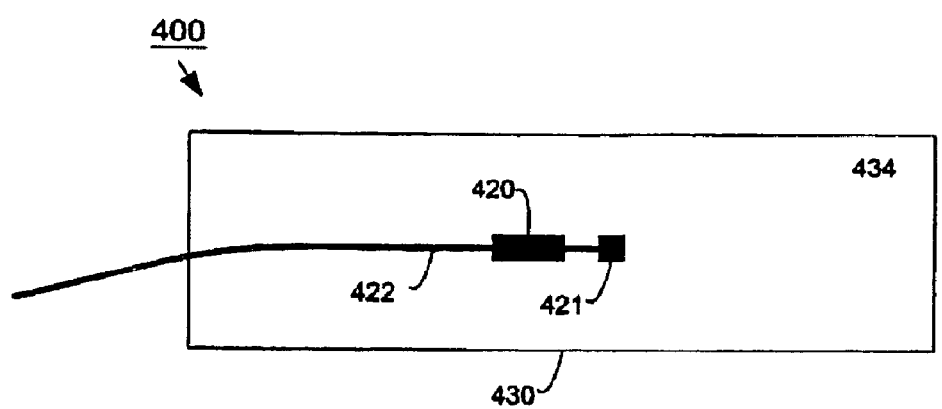

FIG. 3 depicts a second surface of antenna module 400. Here, a connector 420 is shown formed on the second surface, with a coaxial cable 422 secured to substrate 430. The center conductor of coaxial cable 422 may be connected to one of the dipole antenna elements (for instance it may be passed through substrate 430 at pad 421 and soldered, connecting the center conductor of coaxial cable 422 to element 416 (FIG. 2). The shield of coaxial cable 422 may be connected to the other dipole antenna element. For instance, the shield may be soldered and/or clasped to connector 420 on a backside 434 of substrate 430 and electrically coupled to antenna element 414 through a series of vias.

Figure 4:
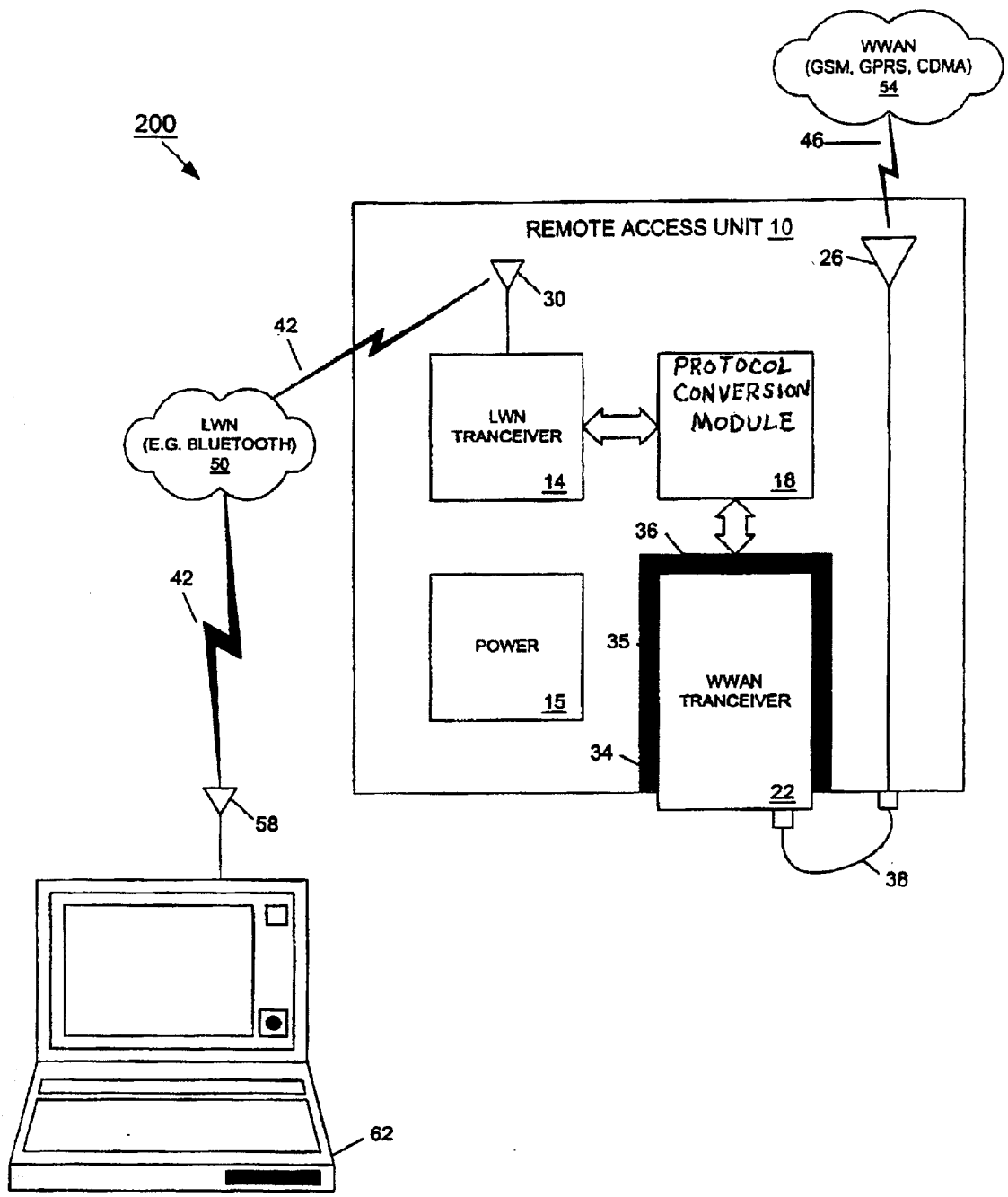
FIG. 4 depicts an embodiment of the remote access unit, as used in a typical wireless networking system, including a local computing device.

FIG. 4 illustrates a wireless data networking system 200 in accordance with the present invention. It should be noted that remote access unit 10 is configured to show an exemplary local computing device, such as a laptop computer 62, which includes a LWN transceiver (not shown) that is complementary to the LWN transceiver 14. LWN transceiver 14 may be added to the chipset of the mother board within laptop computer 62 or it may be coupled to computer 62 through an input/output port such as, for example, a Universal Serial Bus, parallel port, or a PCMCIA slot. A LWN antenna 58, shown primarily for illustration purposes, is used to provide a link 42 to LWN 50.

Data communications may occur between computer 62 and an IAP, ISP, or another remote computer coupled to WWAN 54. A PCMCIA WWAN transceiver 22 may be placed in WWAN transceiver slot 34 of the remote access unit 10, thereby providing coupling between computer 62 and remote access unit 10. When computer 62 attempts to logon to a remote network (at the other end of the WWAN 54), a LWN transceiver within computer 62 links through LWN antenna 58 to the LWN transceiver 14 within remote access unit 10. Signals received by LWN transceiver 14 may be passed through protocol conversion module 18 to WWAN transceiver 22. Note that protocol conversion module 18 may repackage or condition the signals received from LWN transceiver 14 for the WWAN transceiver 22 (and vise-versa), by reassembling packet data. Thus, WWAN transceiver 22 receives the data from computer 62 and provides signals for the IAP or ISP at one end of WWAN 54.

The signal from the WWAN transceiver 22 may be radiated out from WWAN antenna 26 to the wireless wide area network 54 over wireless wide area network link 46. From the wireless wide area network 54, the data and communications from the computer 62 may be routed over a leased line or other physical network, or the data and communications may be re-transmitted over another wireless link to a base station or other processing center.

In one embodiment, LWN transceiver 14 in remote access unit 10 may be configured to maintain multiple LWN links 42 to various local computing devices, which may themselves provide network access to multiple users. As well, the local computing devices may be shared resources on a network, such as a printer or fax, or a personal digital assistant.

Figure 5:
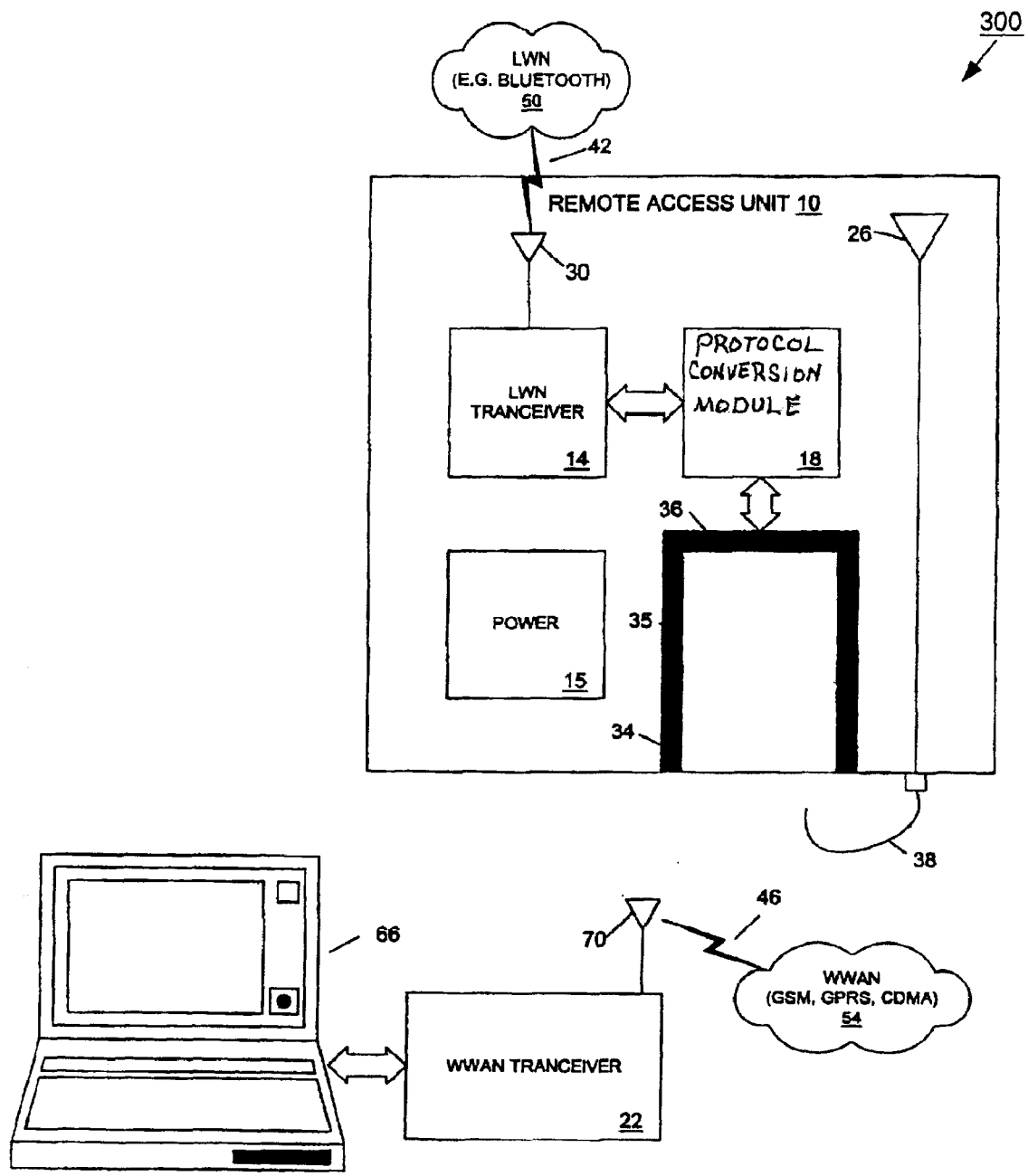
FIG. 5 depicts an embodiment of a wireless networking system using an embodiment of the remote access unit with a wireless wide area network transceiver removed from the remote access unit.

FIG. 5 depicts an embodiment of a wireless data networking system 300, with the WWAN transceiver 22 removed from remote access unit 10 and re-inserted into a computer 66. A wireless wide area network antenna 70 is shown attached to WWAN transceiver 22, although it may be installed within computer 66.

By now it should be apparent that a wireless data networking system having improved antenna performance has been described. The improved antenna performance provides increased speed and bandwidth for a computing device, as well as increased reliability in the wireless interconnection to a remote network, such as an IAP or ISP.

Although particular embodiments of the present inventions have been shown and described, it will be understood that it is not intended to limit the present inventions to the preferred embodiments, and it will be obvious to those skilled in the art that various changes and modifications may be made without departing from the spirit and scope of the present inventions. Thus, the present inventions are intended to cover alternatives, modifications and equivalents, which may be included within the spirit and scope of the present inventions as defined by the claims.

What is claimed is:

1. A system comprising:
   a remote access unit including:
      a wireless wide area network transceiver,
      a wireless wide area network antenna coupled to the wireless wide area network transceiver,
      a local wireless network transceiver,
      a local wireless network antenna coupled to the local wireless network transceiver, and
      a protocol conversion module configured to communicatively couple the local wireless network transceiver to the wireless wide area network transceiver; and
   a computer having a slot for the wireless wide area network transceiver removed from the remote access unit and placed in the slot in the computer.

2. The system of claim 1, wherein the remote access unit further comprises a slot configured to receive the wireless wide area network transceiver and an electrical receptacle within the slot for communicatively coupling the wireless wide area network transceiver to the protocol conversion module.

3. The system of claim 2, wherein the remote access unit further comprises an RF cable configured to couple the wireless wide area network antenna to the wireless wide area network transceiver.

4. The system of claim 2, wherein the slot and receptacle are PCMCIA compliant, and wherein the wireless wide area network transceiver is housed in a PCMCIA compliant enclosure that complements the slot and receptacle.

5. The system of claim 2, wherein the remote access unit further comprises an RF cable configured to couple the wireless wide area network antenna to the wireless wide area network transceiver, the RF cable being exposed while the wireless wide area network antenna is coupled to the wireless wide area network transceiver.

* * * * *